US007512282B2

(12) United States Patent
Lang et al.

(10) Patent No.: US 7,512,282 B2
(45) Date of Patent: Mar. 31, 2009

(54) METHODS AND APPARATUS FOR INCREMENTAL APPROXIMATE NEAREST NEIGHBOR SEARCHING

(75) Inventors: Christian A. Lang, New York, NY (US); Min Wang, Cortlandt Manor, NY (US)

(73) Assignee: International Business Machines Corporation, Armonk, NY (US)

(*) Notice: Subject to any disclaimer, the term of this patent is extended or adjusted under 35 U.S.C. 154(b) by 689 days.

(21) Appl. No.: 11/217,784

(22) Filed: Aug. 31, 2005

(65) Prior Publication Data

US 2007/0050566 A1    Mar. 1, 2007

(51) Int. Cl.
*G06K 9/36* (2006.01)
(52) U.S. Cl. ...................................... 382/240
(58) Field of Classification Search .............. 382/240, 382/305–306; 358/403; 707/1–10, 100–104.1, 707/200–205
See application file for complete search history.

(56) References Cited

U.S. PATENT DOCUMENTS 6,947,934 B1 * 9/2005 Chen et al. ..................... 707/7

OTHER PUBLICATIONS

Hjaltson et al, "Incremental Similarity Search in Multimedia Databases," Institute for Advanced Computer Studies, University of Maryland, College Park, MD (Nov. 2000).
Hjaltason et al, "Ranking in Spatial Databases," Proceedings of the 4th Symposium on Spatial Databases, Portland, Maine (Aug. 1995).
Chekuri et al., "Well-linked Terminals for Node-Capacitated Routing Problems," (Nov. 15, 2005).

* cited by examiner

*Primary Examiner*—Jose L Couso
(74) *Attorney, Agent, or Firm*—Ryan, Mason & Lewis, LLP

(57) ABSTRACT

Methods and apparatus are provided for incremental approximate nearest neighbor searching. An approximate nearest neighbor is incrementally retrieved from a data set having a plurality of objects and cells of objects in a hierarchical organization based on a query object. The present invention maintains an object priority queue to organize the objects based on a distance to the query object and a cell priority queue to organize the cells of objects based on a distance to the query object. The next approximate nearest neighbor is incrementally retrieved based on a state of one or more of the object priority queue and the cell priority queue.

1 Claim, 3 Drawing Sheets

METHODS AND APPARATUS FOR INCREMENTAL APPROXIMATE NEAREST NEIGHBOR SEARCHING

FIELD OF THE INVENTION

The present invention relates generally to the field of data processing, and more particularly, to methods and apparatus for incremental approximate nearest neighbor searches in large data sets.

BACKGROUND OF THE INVENTION

Nearest neighbor searching is an important problem in various applications, including e-commence product searches, web searches, image retrieval, data mining, pattern recognition, and data compression. The problem can be formally described as follows. Given a set S of data points, the task is to process these data points so that, given any query data point q, the data point nearest to q (with respect to a certain distance measure) can be reported quickly.

In many applications, users are satisfied with finding an approximate answer that is "close enough" to the exact answer. The approximate nearest neighbor can be defined as the follows. Consider a set S of data points and query point q. Given $\epsilon > 0$, a point p is said to be a $(1+\epsilon)$-approximate nearest neighbor of q if:

$$\text{Dist}(p,q) \leq (1+\epsilon)\text{dist}(p^*,q)$$

where $p^*$ is the true nearest neighbor to q.

A number of techniques have been proposed or suggested for determining an approximate nearest neighbor (ANN), especially for high-dimensional data retrieval since exact nearest neighbor retrieval can become very inefficient in such settings. For example, Sunil Arya et al., "An Optimal Algorithm for Approximate Nearest Neighbor Searching in Fixed Dimensions," J. of the ACM, (1994) focuses on improving index structures and better pruning techniques under the assumption that the number of desired ANNs is known in advance.

A need exists for improved methods and apparatus for approximate nearest neighbor searches. A further need exists for methods and apparatus for incremental approximate nearest neighbor searches in large data sets. Yet another need exists for methods and apparatus for incremental approximate nearest neighbor searches that do not require the number of desired ANNs to be known in advance.

SUMMARY OF THE INVENTION

Generally, methods and apparatus are provided for incremental approximate nearest neighbor searching. According to one aspect of the invention, an approximate nearest neighbor is incrementally retrieved from a data set having a plurality of objects and cells of objects in a hierarchical organization based on a query object. The present invention maintains an object priority queue to organize the objects based on a distance to the query object and a cell priority queue to organize the cells of objects based on a distance to the query object. The next approximate nearest neighbor is incrementally retrieved based on a state of one or more of the object priority queue and the cell priority queue.

The object priority queue or cell priority queue (or both) can be maintained, for example, based on a requested maximum error or on cells visited. A state of the object and cell priority queues is maintained for future requests. The next item in the object and cell priority queues is determined that is the next approximate nearest neighbor to the query object.

A more complete understanding of the present invention, as well as further features and advantages of the present invention, will be obtained by reference to the following detailed description and drawings.

DETAILED DESCRIPTION OF PREFERRED EMBODIMENTS

The present invention provides methods and apparatus for incremental approximate nearest neighbor searches. Generally, given a set S of n objects, a query object q, an error bound $\epsilon$, and a distance metric, dist, that measures the distance between any two objects, the present invention incrementally retrieves the next $\epsilon$-approximate nearest neighbor ($\epsilon$-ANN) of q from S. In other words, the present invention finds the ($\epsilon$-ANN) of q from the set S in the first step. Assume p is returned as the answer. In each subsequent iteration, the ($\epsilon$-ANN) of q is found from the remaining points of set S (i.e., set S-$\{p\}$). Of course, a naïve way to do incremental approximate nearest neighbor search is to run an approximate nearest neighbor search algorithm from scratch repeatedly on the changing data set once every answer is returned and selected from the data set. In the present invention, a more efficient method is disclosed than this naïve approach.

Figure 1:
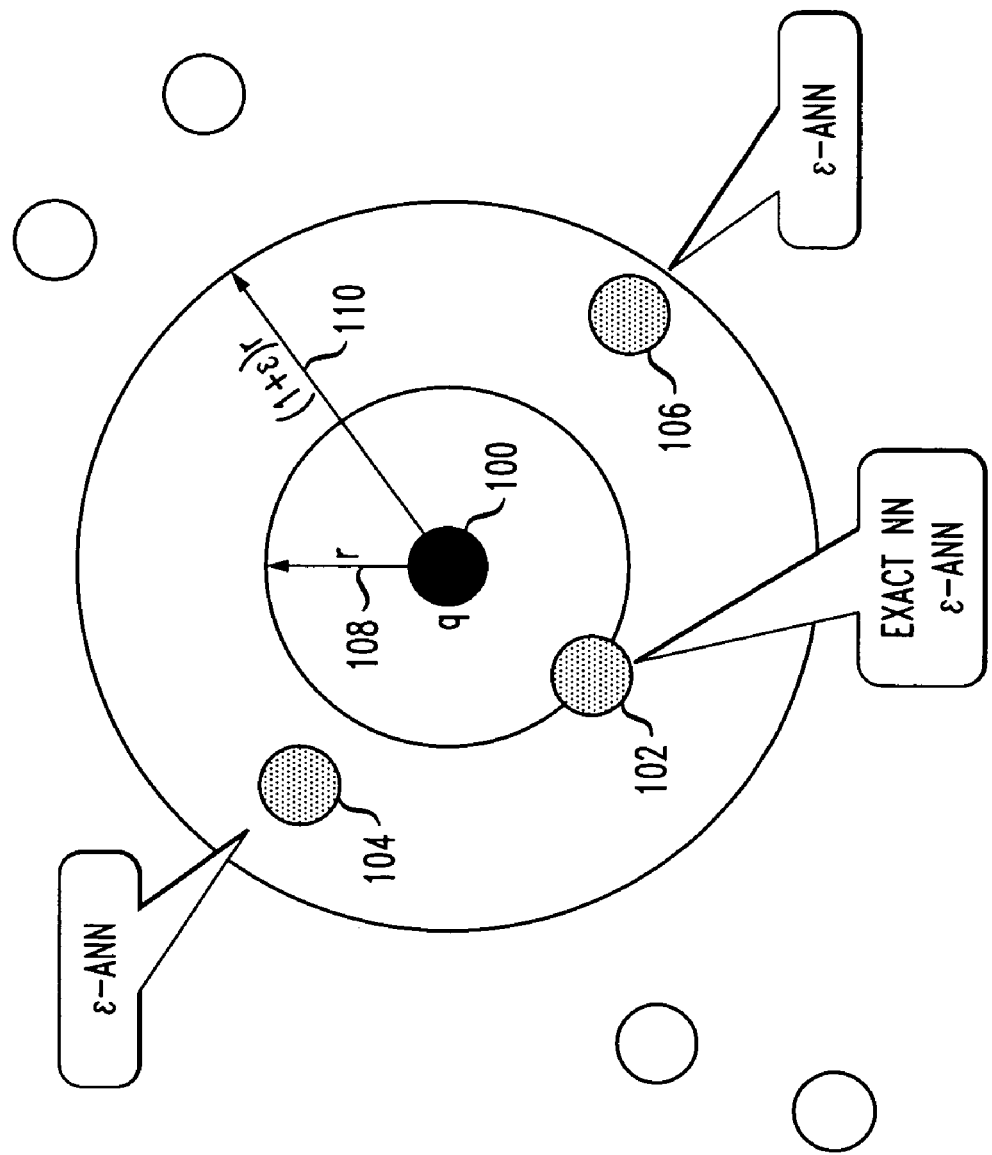
FIG. 1 illustrates the definition of approximate nearest neighbor.

FIG. 1 illustrates the definition of approximate nearest neighbor. As shown in FIG. 1, a data point q (100) is the query point and all the other points in FIG. 1 belong to the data set S. In this example, data point 102 is the exact nearest neighbor of q and its distance to q is r (108).

Given a data set S and a query point q, let r be the distance of the exact nearest neighbor of q. The $\epsilon$-approximate nearest neighbors ($\epsilon$-ANNS) of q are all data points in S whose distance to q is smaller or equal to $(1+\epsilon)r$. In the example of FIG. 1, r is the distance 100 and the ANNs are 102, 104, and 106. Note that the exact nearest neighbor is always an $\epsilon$-ANN.

The definition of $\epsilon$-ANN can be extended to $\epsilon$-k-ANN as follows. Given a data set S and a query point q, let r be the distance of the exact kth nearest neighbor of q. The $\epsilon$-approximate kth nearest neighbors ($\epsilon$-k-ANN) of q are all data points in S whose distance to q is smaller or equal to $(1+\epsilon)r$.

Intuitively, these are all the points with an error of $\epsilon$ away from the true k nearest neighbors. In the example of FIG. 1, the $\epsilon$-2-ANNs are (among other possibilities) points 102 and 106, while the true 2-NNs of q are points 102 and 104.

Figure 2:
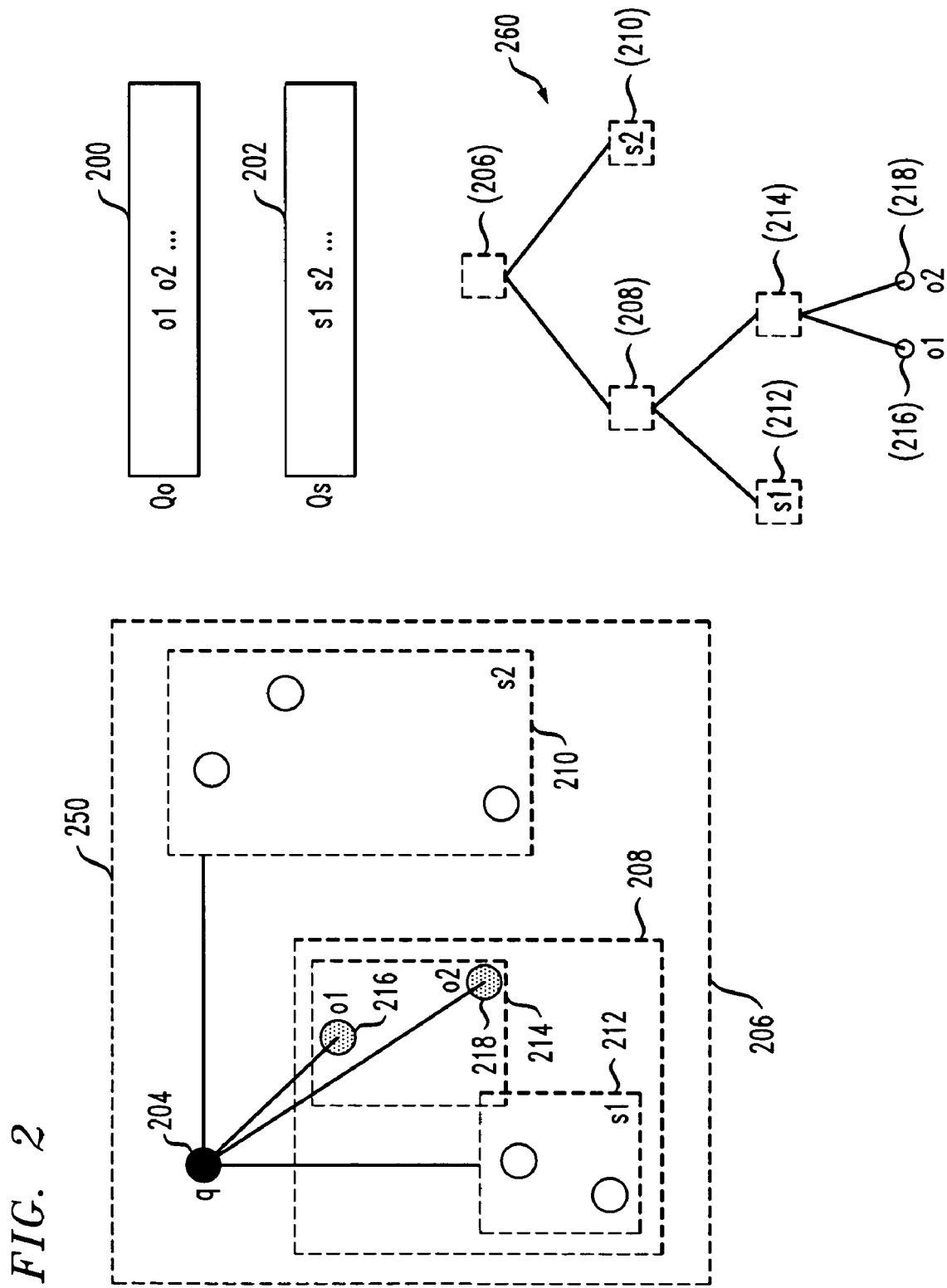
FIG. 2 illustrates a number of data structures employed by the present invention.

FIG. 2 illustrates a number of exemplary data objects 204 through 218 that may be processed by the present invention using two priority queues 200, 202 to identify one or more approximate nearest neighbors. As shown in FIG. 2, the present invention employs a data decomposition structure of the objects 204 through 218 and two priority queues 200, 202. The main data structure is based on a hierarchical decomposition of the space. The boxes 250 and the tree 260 represent such a decomposition. The query point q 204 is shown in FIG. 2.

Each node in the tree 260 is either associated with a data object or a region of space called a cell (i.e., a set of data objects). In this example, nodes 206, 208, 210, 212 and 214 in the tree 260 are associated with the regions represented by the corresponding boxes 250. Note that box 206 represents the whole space that contains all data points and it corresponds to the root of the tree. Nodes 216 and 218 represent two data points in cell 214. It is to be noted that only the innermost cells contain data objects. In this example, each cell is "summarized" through a bounding rectangle (shown as a dashed line). In general, this may be a more general structure or can be omitted entirely. However, if present, this summary information has to be consistent with the nesting structure. For example, in this case, the bounding box of a cell has to be enclosed by the bounding rectangle of its super-cell.

The data structures shown in FIG. 2 can be updated incrementally whenever data items are inserted/deleted or in a batch fashion by rebuilding it periodically. The invention does not restrict the data structure other than it has to be a hierarchical structure, as would be apparent to a person of ordinary skill. Example candidates for such structures are the R-tree index or the k-d-tree index.

Two priority queues, 200 and 202 are also maintained. Queue 200 is a queue Qo for storing data objects that are processed, and queue 202 is a queue Qs for storing the cells that are processed, as discussed further below in conjunction with FIG. 3.

ANN Search Method

Figure 3:
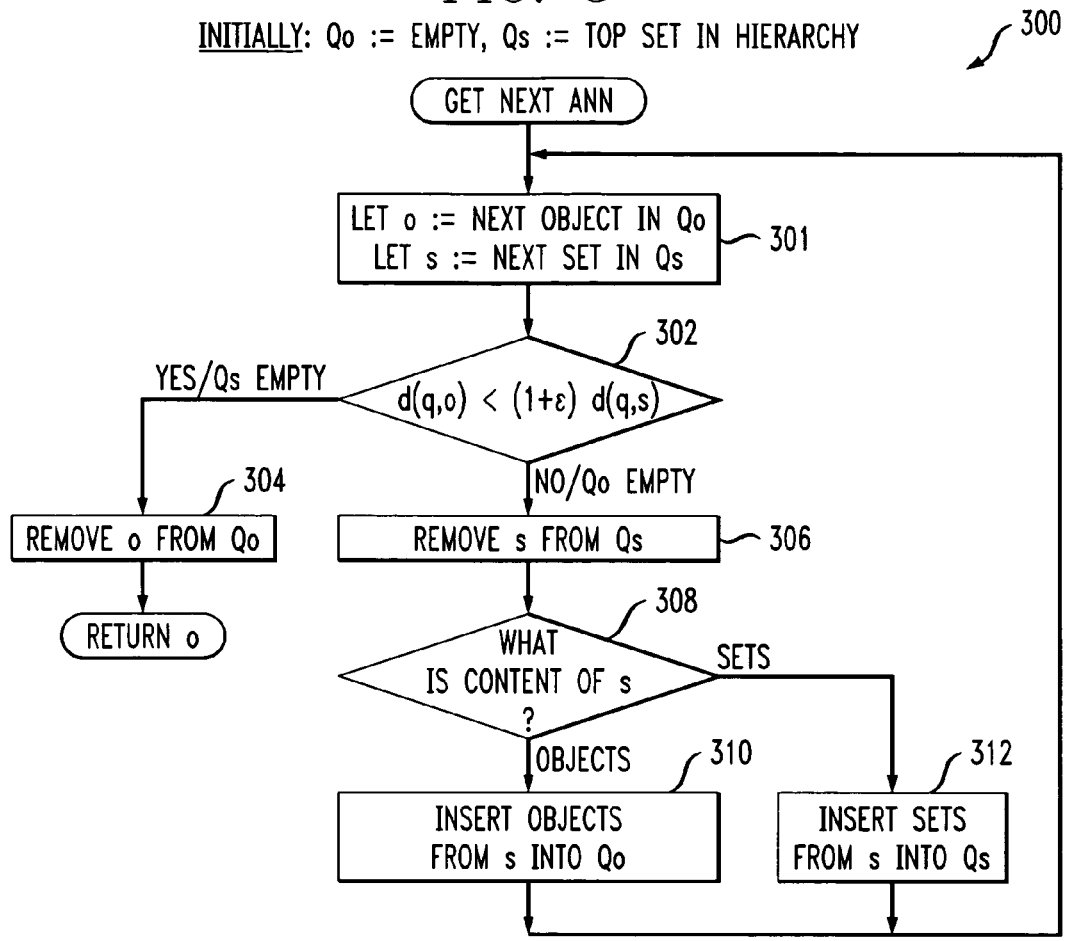
FIG. 3 shows a flow diagram of the approximate nearest neighbor algorithm.

FIG. 3 is a flow diagram illustrating an exemplary implementation of the incremental approximate nearest neighbor algorithm 300. Generally, the method 300 traverses the hierarchical data structure and keeps track of which cells may contain potential ANNs (stored in queue Qs) and which data points are ANN candidates so far (stored in queue Qo). The method is incremental in the sense that it iteratively returns an ANN to the user who can then request another ANN. The first returned ANN will be an $\epsilon$-1-ANN, the second an $\epsilon$-2-ANN, and so on. The state of the queues is stored between requests. Thus, no extra startup overhead is incurred. Also, every data point is returned at most once for the same reason.

In the following discussion, the method 300 is discussed in detail. Initially, the two priority queues Qo and Qs are initialized. For each request to get the next ANN, several steps are performed. First, in step 301, variable o is initialized to the next object in Qo and variable s is initialized to the next set in Qs. Next, in step 302, the distance between q and o, d(q,o), is compared with the distance between q and s, d(q,s).

If the former, d(q,o), is less than (1+$\epsilon$) times the latter, d(q,s), or if Qs is empty, the execution continues with step 304, otherwise execution continues with step 306. In step 304, o is removed from Qo and returned. In step 306, s is removed from Qs and in step 308, its content is examined. If s contains more sets, the execution continues with step 312, otherwise execution continues with step 310. In step 312, the sets contained in s are inserted into Qs and execution continues with step 300. In step 310, the objects contained in s are inserted into Qo and execution continues with step 300.

Updates to the data points are supported through the underlying data partitioning structure. The present invention does not assume any specific method for inserting, deleting, or changing data points. The present invention works with any structure that partitions the data hierarchically. Therefore, known structures such as R-trees can be used to allow for dynamic data sets. One advantage of this invention is that it can be used on top of any such hierarchical data structure (whether or not dynamic) and enhances the functionality of the system by providing ANN search methods.

Figure 4:
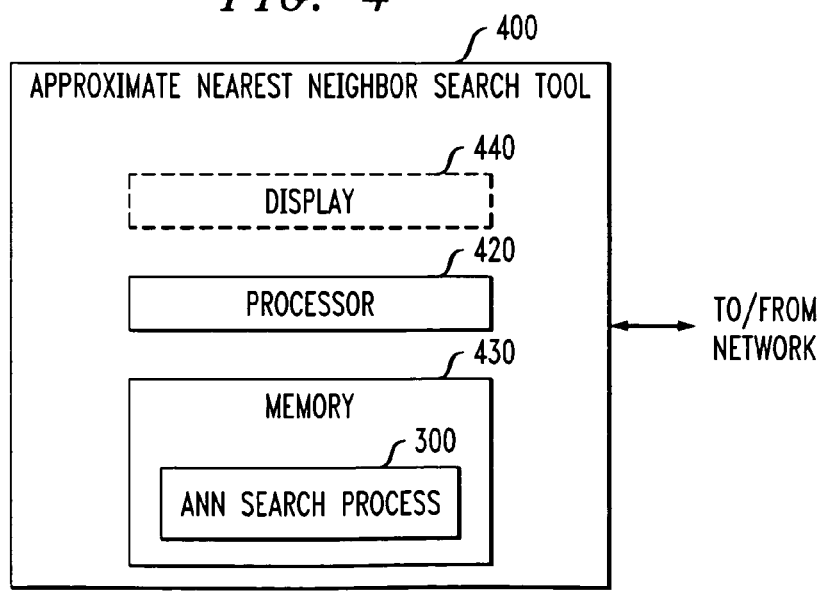
FIG. 4 is a schematic block diagram of an approximate nearest neighbor search tool incorporating features of the present invention.

FIG. 4 is a block diagram of an incremental approximate nearest neighbor search tool 400 that can implement the processes of the present invention. As shown in FIG. 4, memory 430 configures the processor 420 to implement the ANN search methods, steps, and functions disclosed herein and discussed in conjunction with FIG. 3. The memory 430 could be distributed or local and the processor 420 could be distributed or singular. The memory 430 could be implemented as an electrical, magnetic or optical memory, or any combination of these or other types of storage devices. It should be noted that each distributed processor that makes up processor 420 generally contains its own addressable memory space. It should also be noted that some or all of computer system 400 can be incorporated into an application-specific or general-use integrated circuit.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

What is claimed is:

1. A method embodied on a computer readable recordable medium for incrementally retrieving an approximate nearest neighbor from a data set having a plurality of objects and cells of objects in a hierarchical organization based on a query object, comprising: using a computer to implement the steps of maintaining an object priority queue to organize said objects based on a distance to said query object;

maintaining a cell priority queue to organize said cells of objects based on a distance to said query object;

incrementally retrieving a next approximate nearest neighbor based on a state of one or more of said object priority queue and said cell priority queue;

determining a next item in said object priority queue and said cell priority queue that is the next approximate nearest neighbor to said query object;

evaluating whether said next item in said cell priority queue is an object or a cell of objects; and providing said approximate nearest neighbor.

* * * * *